United States Patent [19]

Marshall et al.

[11] 3,962,516

[45] June 8, 1976

[54] PRODUCTION OF POLYESTER TIRE YARN

[75] Inventors: Robert Moore Marshall, Chester; Kimon Constantine Dardoufas, Richmond, both of Va.

[73] Assignee: Allied Chemical Corporation, New York, N.Y.

[22] Filed: June 4, 1975

[21] Appl. No.: 583,826

Related U.S. Application Data

[63] Continuation of Ser. No. 412,368, Nov. 1, 1973, abandoned.

[52] U.S. Cl. .......................... 428/394; 156/110 A; 427/390; 427/407
[51] Int. Cl.² .................................... B32B 27/04
[58] Field of Search .................... 252/8.6, 8.75, 8.9; 427/390, 407, 394; 428/394; 156/110 A

[56] References Cited
UNITED STATES PATENTS

| | | | |
|---|---|---|---|
| 2,425,755 | 8/1947 | Roberts et al. ........................ | 252/8.9 |
| 3,338,830 | 8/1967 | Stokes et al. ........................ | 252/8.9 |
| 3,672,977 | 6/1972 | Darfoufas ........................ | 117/138.8 |
| 3,850,658 | 11/1974 | Gomez et al. ........................ | 117/138.8 |

*Primary Examiner*—Cameron K. Weiffenbach
*Assistant Examiner*—R. Eugene Varndell, Jr.
*Attorney, Agent, or Firm*—Fred L. Kelly

[57] ABSTRACT

An improved polyethylene terephthalate tire yarn is prepared by applying to the yarn a finish composition consisting essentially of a polyalkylene glycol compound having the formula

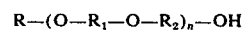

$$R-(O-R_1-O-R_2)_n-OH$$

in which $R_1$ and $R_2$ are the same or different lower alkylene units such as ethylene, propylene and so forth up to 5 carbon atoms, R is an alkyl group containing 1 to 8 carbon atoms, and $n$ has a value to produce a molecular weight of at least about 300. Preferably, the yarn is thereafter heated for 10 to 160 seconds at a temperature of from about 215° to 230°C. This method of finishing the tire yarn results in an improved compression-extension durability of the fiber in rubber.

4 Claims, No Drawings

PRODUCTION OF POLYESTER TIRE YARN

This is a continuation of application Ser. No. 412,368, filed Nov. 1, 1973, now abandoned.

BACKGROUND OF THE INVENTION

This invention relates to multifilament polyester yarns and particularly to improved multifilament polyethylene terephthalate yarns for industrial uses. More particularly, it relates to an improved multifilament polyethylene terephthalate yarn and a new fiber finishing process for polyethylene terephthalate yarns in which novel fiber finish compositions are applied to said yarns. Still more partiuclarly, it relates to a fiber finish composition designed specifically for tire cord processing for polyethylene terephthalate yarns.

Many fiber finish compositions are known. Some are quite specific in composition and relate to specific type fibers. Small changes in fiber finish composition frequently result in tremendous improvements in not only processing but also in end use of the fiber.

Polyester tire yarn finishes generally consist of a combination of a lubricant, an antistat, and several emulsifiers. For example, U.S. Pat. No. 3,687,721 discloses an improved polyester tire yarn treated with a composition comprising decaglycerol tetraoleate, glycerol monooleate, ethoxylated tall oil fatty acid, sulfated glycerol trioleate, ethoxylated alkylamine and hexadecyl stearate. Obviously, maintaining the proper ratio of lubricant, antistat and emulsifiers is essential for consistent performance of the tire yarn. Moreover, many prior art processes require applying a first finish composition during spinning of the yarn and a subsequent overfinish in order to obtain optimum physical properties. Clearly, it would be a significant advance in this art to find a single ingredient finish that could be used as a single finish for polyester yarn or as an overfinish to provide a tire yarn with excellent properties for use in tires.

SUMMARY OF THE INVENTION

Therefore, it is a primary object of this invention to provide an improved polyester multifilament yarn which is treated with a single component finish composition. It is another object of this invention to provide a method of finishing polyester tire yarn which results in an improved compression-extension durability of the fiber in rubber.

These and other objects are accomplished in accordance with this invention with a finish for polyester yarns consisting essentially of a polyalkylene glycol compound having the formula $$R-(O-R_1-O-R_2)_n-OH$$

in which $R_1$ and $R_2$ are the same or different alkylene units having up to 5 carbon atoms, R is a alkyl group containing 1 to 8 carbon atoms and $n$ has a value to produce a molecular weight of at least about 300. The finish composition may be diluted with water to a water content up to about 80 weight precent of the dituted composition. The finish composition is applied to polyester yarns including, for example, polyethylene terephthalate yarns by any known means including bath, spray, padding, kiss roll application or the like. The composition is applied to the yarn in an amount sufficient to supply 0.5 to 1.5% polyglycol ether based on the weight of the yarn. The yarn is made into tire cord by known procedures and thereafter tensilized by heating for 10 to 160 seconds at a temperature of from about 215° to 230°C. to improve heat stability.

Certain terms referred to within the specification and claims are defined below.

The term "translational efficiency $[E_T]$" is that percent of breaking strength in the yarn after undergoing cord preparation. $[E_T]$ is the ratio between cord breaking strength and the sum of breaking strengths of the individual yarns expressed in percent and measured on an Instron.

$$\text{For Greige Cord} = \frac{\text{Greige Cord Breaking Strength} \times 100}{\epsilon \text{ Individual Yarn Breaking Strengths}}$$

$$\text{For Tensilized Cord } E = \frac{\text{Tensilized Cod Breaking Strength} \times 100}{\text{Greige Cord Breaking Strengths}}$$

"Disc fatigue" is defined and described in scope, principle and testing procedure as follows:

This test is used to determine the ability of a textile tire cord to resist degradation when subjected to repeated cycles of compression and extension.

The disc fatigue tester cyclically compresses and extends cord specimens that have been embedded in rubber blocks. After a specified number of compression and extension cycles, the cords are removed from the blocks and tested for tensile strength. The strength of these cords is then compared with that of similar cords that have been cured in rubber but have not been fatigued. The results are then reported in percent strength retained. This method is more specifically described in U.S. Pat. No. 2,595,069.

DESCRIPTION OF THE PREFERRED EMBODIMENT

As mentioned above, the value of $n$ in the formula $$R-(O-R_1-O-R_2)_n-OH$$

is such as to yield a molecular weight of at least about 300. There is no known maximum limitation for the molecular weight although the lower range, particularly that of from 300 to 600, is preferred since compounds in this range are more soluble as well as being more available and economical. The critical nature of the minimum molecular weight of the polyalkylene glycol compound results from the fact that excessive fuming during drawing of the fiber and poor static protection results when the molecular weight is less than about 300.

The preferred polyalkylene glycol compounds of the present invention are so-called random copolymers, preferably, random copolymers made from ethylene oxide and propylene oxide. Ethylene oxide and propylene oxide are reacted simultaneously to form mixed polyalkylene glycol compounds. For example, with alcohols, mixed polyoxyethylated-polyoxypropylated monoethers result in accordance with the following equation:

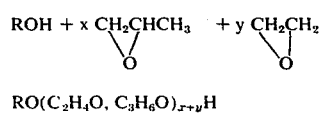

where R is as described above, where $x$ is the number of moles of propylene and $y$ is the number of moles of ethylene oxide. We prefer to use such compounds which are condensation products of 40 to 60% ethylene oxide and 40 to 60% propylene oxide on a mol basis, terminated with an alcohol containing 3 to 5 carbon atoms. Typical prior art in this field includes U.S. Pat. No. 2,425,755 and U.S. Pat. No. 2,425,845.

Polyalkylene glycols and their derivatives made by such procedures are sold under the trade-name Ucon (Union Carbide Corporation). The code number after the series designation indicates the viscosity at 100°F. in Saybolt universal seconds (S.U.S.) in the Ucon series. All members of the Ucon 50-HB and Ucon 75-H series are water soluble while the Ucon LB and Ucon D series are water-insoluble. For use in the present invention, the water-soluble compounds are preferred. Optimum results have been obtained with polyoxyethylated-polyoxypropylated monoethers which are condensation products of 50% ethylene oxide and 50% propylene oxide terminated with butyl alcohol said monoethers having a viscosity of 75–300 S.U.S., preferably 100 to 200 S.U.S.

In addition to the critical nature of the finish composition, it has also been found that the heat treatment of the yarn subsequent to the application of the process finish composition is likewise critical for achieving optimum results in accordance with the invention. The use of too high a temperature of heat treatment will cause fusion of the fibers as well as causing a drop in strength properties. The maximum temperature will be governed by the melting point or degradation of the particular fibers used. The minimum temperature necessary to achieve satisfactory heat stability of the tire cord in this process has been found to be about 200°C. when polyethylene terephthalate is the polyester fiber. The preferred temperature is from about 215° to 230°C.

Furthermore, the time/temperature relationship of the heat treatment must be carefully controlled so that the fiber properties do not suffer impairment. Too long a treatment, even at preferred temperatures will tend to degrade the fibers. Normally, the heat treating step will be carried out so that the surface of the fibers will be raised rapidly to a temperature of 200° to 230°C., preferably 215° to 230°C. and kept at that temperature for several seconds, preferably 10 to 160 seconds, although no absolute time can be set for optimum results. A satisfactory criterion for determining the best time/temperature relationship is to measure the heat stability of the fiber, both heat treated and untreated. Of course, the instant heat treatment should significantly improve the heat stability of the fiber. Any means for heating the surface of the fiber may be used and a large variety of suitable apparatus is available in the trade.

In order to demonstrate the invention, the following examples are given. They are provided for illustrative purposes only and are not to be construed as limiting the scope of the invention, which is defined by the appended claims. In these examples, parts and percentages are by weight.

The yarns of this invention can be processed by any spin draw process or spinning and separately drawing process available to the art in the patent and technical literature, using any suitable polyester which provides the high tenacity yarn of about 9 grams per denier and minimum elongation of about 13 percent.

EXAMPLE 1

For comparative testing, a polyethylene terephthalate tire yarn was prepared as described in U.S. Pat. No. 3,672,977, i.e., a 1300 denier, 192 filament yarn was prepared comprised of polyethylene terephthalate filaments treated with about 0.45 percent based on the weight of the yarn of a liquid spin finish consisting of 14.7 parts refined coconut oil, 14.7 parts hexadecyl stearate, 12.7 parts ethoxylated lauryl alcohol, 9.8 parts sodium petroleum sulfonate, 4.9 parts ethoxylated tallow amine, 2 parts of sodium salt of sulfonated succinic ester, 2 parts 4,4'-thio-bis(6-tert-butyl-m-cresol) and 39.2 parts mineral oil having a boiling point between 510° and 620°F. Drawing performance of the yarn was excellent. Finish oil on the fiber was 0.2 weight percent. For convenience, this prior art yarn is designated Yarn A.

In accordance with one embodiment of the present invention, a polyglycol ether described herein was applied as an overfinish to Yarn A instead of the overfinish disclosed in U.S. Pat. No. 3,672,977. The instant polyglycol ether finish was a condensation product of 50% ethylene oxide and 50% propylene oxide terminated with butyl alcohol, having a viscosity of 100 S.U.S. at 100°F. The polyglycol ether was applied onto samples of the yarn, first at 0.8% and then at 1.1%, based on the weight of the fiber, resulting in a total oil on yarn of 1.0 and 1.3 percent, including the initial (spin) finish. These two yarn samples were designated Yarn B (0.8% overfinish) and Yarn C (1.1% overfinish).

The three yarn samples were twisted and plied into greige cord. The resulting cords were tensilized by a standard tensilization procedure and the tensilized cord was then tested in the above-described disc fatigue test where the percent breaking strength (B.S.) retention is recorded. The results are shown in Table I.

TABLE I

| Sample | Disc Fatigue % B.S. Retained |
|---|---|
| Yarn A | 62.6 |
| Yarn B | 88.4 |
| Yarn C | 93.3 |

EXAMPLE 2

This example shows that the polyglycol ether finish of the present invention may be used with excellent results as a single finish.

The polyglycol ether finish used was a condensation product of 50% ethylene oxide and 50% propylene oxide terminated with butyl alcohol and having a viscosity of 100 S.U.S. at 100°F. This finish was applied as initial finish to polyethylene terephthalate tire yarn (approximately 1300 denier, 192 filaments) by means of a kiss roll during spinning. After drawing the yarn was heated to 215°–230°C. for a few seconds. The finished yarn was readily twisted and plied into greige cord. The resulting cords were then tensilized and tested as in Example I. To show the effect of application rate, the application level ranged from 0.23% to 1.5% based on the weight of fiber. Yarns with finish levels from 0.8% to 1.0% were considered most desirable in view of relatively low finish required and significantly improved compression-extension durability in rubber as tested in the above-described disc fatigue test where the percent strength retention is recorded. The results are shown in Table II.

TABLE II

| Percent Finish on Yarn | Disc Fatigue % B.S. Retained |
|---|---|
| 0.23 | 75 |
| 0.50 | 85 |
| 0.83 | 91 |
| 1.00 | 93 |
| 1.50 | 94 |

In a comparative test, a tire yarn prepared with a spin finish and an overfinish in accordance with U.S. Pat. No. 3,672,977 showed 77% strength retention at finish levels of from 0.83 to 1.25% based on the weight of fiber.

EXAMPLE 3

The procedure of Example 1 was followed except that the polyethylene terephthalate yarn was first treated with from about 0.3 to about 0.6 weight percent based on the weight of the yarn of a liquid composition consisting essentially of about 10 to about 20 weight percent of said composition of each hexadecyl stearate and refined coconut oil, about 3.0 to about 6.0 weight percent of said composition of ethoxylated tallow amine, about 10 to about 20 weight percent of said composition of ethoxylated lauryl alcohol, about 8.0 to about 12.0 weight percent of said composition of sodium salt of alkylaryl sulfonate, about 1.0 to about 3.0 weight percent of dinonyl-sodium-sulfosuccinate, about 1.0 to about 3.0 weight percent of said composition of 4,4'-thio-bis-(3-methyl-6-tert-butylphenol), about 35 to 50 weight percent of said composition of white mineral oil having a boiling point of between 510° and 620°F. and a viscosity of between 38 to 40 S.U.S. at 100°F. wherein at least about 0.15 to about 0.30 weight percent is retained on said yarn, and then the yarn was treated with the polyglycol ether overfinish of Example 1. A control yarn prepared in accordance with the procedure of U.S. Pat. No. 3,672,977 was also spun. Representative samples were twisted and plied into greige cord. In this operation the percent strength retained $E_T$ for each sample was recorded. The resulting cords were then tensilized by a standard tensilization procedure and the $E_T$ for this operation also repeated. The tensilized cord was then tested in the disc fatigue test where the percent breaking strength retention is recorded. The results are shown in Table III.

TABLE III

| | $E_T$ Yarn to Greige Cord | $E_T$ Greige Cord to Tensilized Cord | Disc Fatigue % B.S. Retained |
|---|---|---|---|
| Control | 90.1 | 89.1 | 89 |
| Instant Overfinish | 92.3 | 90.5 | 89 |

EXAMPLE 4

The procedure of Example 1 was followed except that the polyalkylene glycol compound applied to the yarn was a condensation product of 50% ethylene oxide and 50% propylene oxide terminated with methyl alcohol, having a viscosity of 100 S.U.S. at 100°F. The amount of finish on the yarn was 1.13% based on the fiber, and the cord construction was 1,000d 3 ply with 9 × 9 twist. Conventional tests showed that the instant finish provides basically the same properties in yarn, cord, and in rubber testing as a control finish which is used on commercial tire yarn, i.e., performance, quality, static, friction, and adhesion to rubber were good. Product test results are shown in Table IV. However, surprisingly, we found that the greige cords prior to tensilization at 215°-227°C. for 100 seconds showed very poor heat stability relative to the control (47.5% vs. 79.6% B.S. retained).

TABLE IV

| Total finish oil on yarn, percent by wt. | 1.13 |
|---|---|
| Yarn: | |
| Breaking strength in lbs. | 19.1 |
| Percent elongation at break | 13.0 |
| Dipped tensilized cord: | |
| Breaking strength in lbs. | 55.1 |
| Percent elongation at break | 19.1 |
| Translational efficiency, percent | 90.5 |
| Thermal stability, percent retained strength | 80 |
| Adhesion, 1/4" hot | 19 |
| Adhesion, 1/4" cold | 34 |
| Disc, fatigue, percent | 88 |

EXAMPLE 5

The procedure of Example 2 was followed except that the polyalkylene glycol compound applied to the yarn was Ucon LB-70-X having a viscosity of 70 S.U.S. at 100°F. This finish gave relatively poor static protection to the fiber.

EXAMPLE 6

The procedure of Example 2 was followed except that the polyalkylene glycol compound applied to the yarn was Ucon-50-HB-55 having a viscosity of 55 S.U.S. at 100°F. This finish tended to fume during heating of the fiber to 215°-230°C.

EXAMPLE 7

The procedure of Example 2 was followed except that the polyalkylene glycol ether applied to the yarn was 100% polyethylene glycol ethers with molecular weights ranging from 300 to 600. Yarn performance, quality, static and fricton were good but adhesion to rubber was relatively poor as compared with the product of Example 2.

We claim:
1. Synthetic filamentary yarn comprised of polyethylene terephthalate filaments which are first treated with from about 0.3 to about 0.6 weight percent based on the weight of the yarn of a liquid composition consisting essentially of about 10 to about 20 weight percent of said composition of each hexadecyl stearate and refined coconut oil, about 3.0 to about 6.0 weight percent of said composition of ethoxylated tallow amine, about 10 to about 20 weight percent of said composition of ethoxylated lauryl alcohol, about 8.0 to about 12.0 weight percent of said composition of sodium salt of alkylaryl sulfonate, about 1.0 to about 3.0 weight percent of dinonyl-sodium-sulfosuccinate, about 1.0 to about 3.0 weight percent of said composition of 4,4'-thio-bis(3-methyl-6-tert-butylphenol), about 35 to 50 weight percent of said composition of white mineral oil having a boiling point of between 510° and 620°F. wherein at least about 0.15 to about 0.30 weight percent is retained on said yarn, and then said yarn is treated with 0.5 to 1.5 weight percent based on the weight of the yarn of a polyalkylene glycol finish composition consisting essentially of a polyoxyethylated-polyoxypropylated monoether which is a condensation product of 40 to 60 percent ethylene oxide and 40 to 60 percent propylene oxide on a mol basis, terminated with an alcohol containing 3 to 5 carbon atoms, said polyoxyethylated-polyoxypropylated-monoether having a molecular weight of from 300 to 600 and a viscosity of from 75 to 300 S.U.S. at 100°F.

2. The polyester yarn of claim 1 wherein the polyoxyethylated-polyoxopropylated monoether has a molecular weight of from 300 to 600 and a viscosity of from 100 to 200 S.U.S. at 100°F.

3. The polyester yarn of claim 1 wherein the polyoxyethylated-polyoxypropylated monoether is a condensation product of ethylene oxide and propylene oxide terminated with butyl alcohol, having a molecular weight of from 300 to 600 and a viscosity of about 100 S.U.S. at 100°F.

4. The polyester yarn of claim 1 wherein the yarn is heated to 215° to 230°C. for at least a few seconds after the polyoxyethylated-polyoxypropylated monoether is incorporated on the yarn.

* * * * *